United States Patent
Spock et al.

(10) Patent No.: US 6,496,305 B2
(45) Date of Patent: Dec. 17, 2002

(54) TWO FIBER SUPPORT WITH SINGLE OPTICAL AMPLIFIER

(75) Inventors: Derek Spock, Boston, MA (US); Murat Azizoglu, Concord, MA (US); Jonathan C. Bloch, Boston, MA (US); Farzana I. Khatri, Andover, MA (US); Vijayanand Vusirikala, Westford, MA (US); Eric Arthur Swanson, Acton, MA (US)

(73) Assignee: Sycamore Networks, Inc., Chelmsford, MA (US)

(*) Notice: Subject to any disclaimer, the term of this patent is extended or adjusted under 35 U.S.C. 154(b) by 0 days.

(21) Appl. No.: 09/911,926

(22) Filed: Jul. 23, 2001

(65) Prior Publication Data

US 2002/0141048 A1 Oct. 3, 2002

Related U.S. Application Data

(63) Continuation-in-part of application No. 09/820,266, filed on Mar. 28, 2001, now Pat. No. 6,388,805.

(51) Int. Cl.7 .................................................. H01S 3/00
(52) U.S. Cl. ..................................... 359/349; 359/341.2
(58) Field of Search ............................. 359/349, 341.2, 359/124, 127

(56) References Cited

U.S. PATENT DOCUMENTS

| 5,452,124 A | | 9/1995 | Baker ........................ 359/341 |
| 5,812,306 A | * | 9/1998 | Mizrahi ...................... 359/341 |
| 6,295,149 B1 | * | 9/2001 | Meli .......................... 359/130 |
| 6,342,961 B1 | * | 1/2002 | Bergano et al. .............. 359/124 |
| 6,400,508 B1 | * | 6/2002 | Liu ............................ 359/495 |

* cited by examiner

Primary Examiner—Mark Hellner
(74) Attorney, Agent, or Firm—Lahive & Cockfield, LLP (57) ABSTRACT

An optical amplifier for a 4-fiber system having two inputs and outputs is provided that makes use of a single amplifier rather than two separate amplifiers. The optical amplifier node makes use of an interleaver before and after the single amplifier to demultiplex and multiplex even and odd channel signals traveling in opposite directions. The arrangement can also amplify wide channel spaced signals traveling through a plurality of optical fibers. The optical amplifier node can be combined with other like amplifier nodes to provide more complex amplifier solutions at reduced costs due to the need for only half of the typical number of amplifiers. The optical amplifier node can also be combined with, e.g., variable optical attenuators, L/C/S filters, channel add/drop, co- and counter-propagating Raman amplification, and dispersion compensation modules to modify the optical signals as desired.

22 Claims, 9 Drawing Sheets

TWO FIBER SUPPORT WITH SINGLE OPTICAL AMPLIFIER

RELATED APPLICATION

This application is a continuation-in-part of U.S. patent application Ser. No. 09/820,266 filed Mar. 28, 2001 now U.S. Pat. No. 6,388,805 with the United States Patent Office, which is expressly and entirely incorporated herein by reference.

FIELD OF THE INVENTION

The invention relates to an optical amplifier, and more particularly relates to the use of a single optical amplifier to amplify signals traveling through a plurality of fibers.

BACKGROUND OF THE INVENTION

Figure 1:
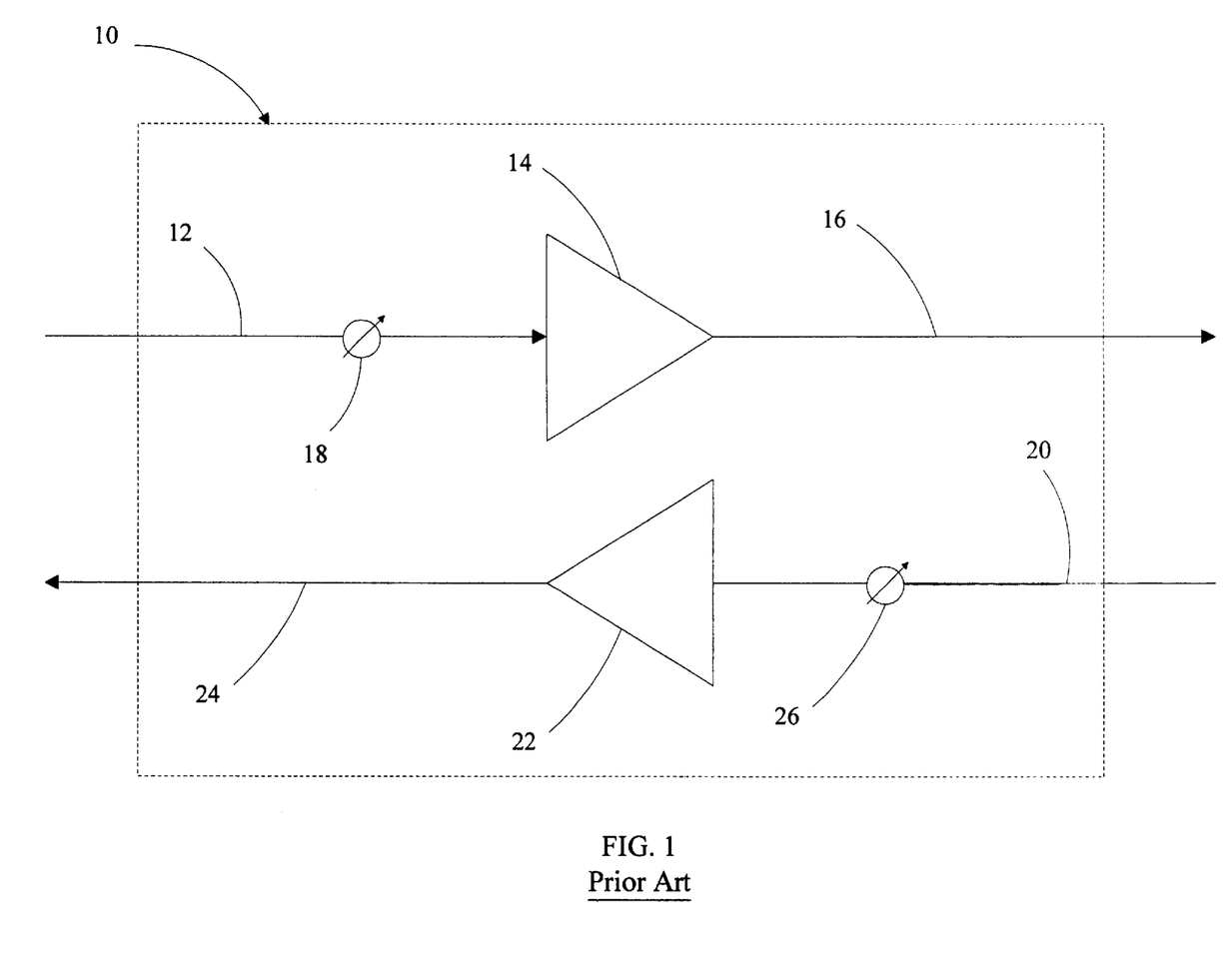
FIG. 1 is a diagrammatic illustration of a known optical amplifier node.

A conventional 4-fiber optical amplifier is illustrated in FIG. 1. The optical amplifier node 10 has a first input fiber 12 that couples with a first variable optical attenuator 18 for attenuating optical signals carried over the first input fiber 12. The variable optical attenuator 18 can be either before or after an amplifier 14. In this instance, the optical signals leave the optical attenuator 18 and pass to the amplifier 14. The resulting amplified optical signals exit the amplifier 14 and pass to a first output fiber 16. A second input fiber 20 carries optical signals entering from the same direction for from a second direction opposite the direction of the signals in the first input fiber 12. The second input fiber 20 couples to a second variable optical attenuator 26. The attenuated optical signals pass to a second amplifier 22. The amplified output from the second amplifier 22 passes to the second output fiber 24.

In this conventional optical amplifier node, each signal path requires a separate optical amplifier. As optical amplifiers are costly, the use of multiple amplifiers poses a significant cost for constructing optical networks.

SUMMARY OF THE INVENTION

There is a need for an optical amplifier node that uses a single amplifier to amplify signals travelling in different directions, or to use a single amplifier to amplify signals traveling in multiple fibers. The present invention is directed toward further solutions. In accordance with aspects of the present invention, an optical amplifier node has a first and second input fiber in communication with a first combiner. A first amplifier is also in communication with the first combiner. A first de-combiner is in communication with the first amplifier, and first and second output fibers are in communication with the first de-combiner. The first and second input fibers, in accordance with one aspect of the present invention, each support signal traffic traveling in opposite, or the same, directions.

The combiners and de-combiners can take the form of interleavers in accordance with one embodiment of the present invention. The optical interleaver can take an optical signal and separate it into, e.g., odd and even channels when the optical signal passes through the interleaver in a first direction or fiber. A number of odd and even channels can also pass through the interleaver in a second direction, opposite to the first direction, and the interleaver will combine those odd and even signals into a combined signal. Further, a number of odd and even channels can also pass through the interleaver in a second fiber, parallel to the first direction, and the interleaver will combine those odd and even signals into a combined signal. The interleaver can separate and combine other types of signals, and in different ways including by bit, byte, signal, channel, wavelength, band, and the like.

The combiner and de-combiner can also take the form of a number of other network components such as, multiplexors, de-multiplexors, L/C/S combiners and de-combiners, fiber Bragg gratings, thin film filters, holographic filters, and the like.

The optical amplifier node, in accordance with a further aspect of the present invention, has a first variable optical attenuator in communication with one of the first input fiber and the first output fiber. The optical amplifier node further has a second variable optical attenuator in communication with one of the second input fiber and the second output fiber.

In addition, the optical amplifier node can have a second amplifier in communication with an L/C splitter and L/C combiner. The function of the L/C splitter is to separate two wavelength bands spatially into two separate fibers. The C band is commonly defined as 1530 nm to 1565 nm, while the L band is commonly defined as 1570 nm to 1610 nm. The L/C combiner takes two separate C and L wavelength bands, and combines them accordingly. Alternatively, the L/C splitter and combiner can be an L/C/S splitter and an L/C/S combiner. The function of the L/C/S splitter is similar to that of the L/C version, except that the LIC/S splitter separates three wavelength bands spatially into three separate fibers. The S band is commonly defined as 1490 nm to 1525 nm. The L/C/S combiner takes three separate C, L, and S wavelength bands and combines them accordingly.

In addition, the optical amplifier can have a Raman amplifier (co- and/or counter-propagating). The function of the Raman amplifier is to use the nonlinear effect in fibers to impart additional gain to the signals by co- and/or counter-propagating additional Raman pump wavelength signals in the fiber(s). Each fiber must have its own Raman amplifier, unlike the optical amplifier, which can be shared. Alternatively, a single Raman amplifier can be shared between many fibers by using an optical splitter.

Prior to a signal reaching the input of the optical amplifier node, the signal can travel through a multiplexor in communication with the combiner. A dispersion compensation module can be positioned on the communication path between the multiplexor and the first combiner. A dispersion compensation module can also be positioned on the communication path between the first combiner and the first amplifier to compensate for dispersion. Alternatively, the optical amplifier node can have a first amplifier that is a multistage access amplifier with an integrated dispersion compensation module. The dispersion compensation module can be shared between a plurality of fibers.

The optical amplifier node, in accordance with other aspects of the present invention, includes a demultiplexor in communication with the first de-combiner off of the output fiber. A dispersion compensation module can be positioned on the communication path between the demultiplexor and the first de-combiner.

Aspects of the present invention further include a method of amplifying an optical signal. The method begins with routing signal traffic traveling originating from opposite directions, or the same direction, through a first combiner to combine each of the traveling signals into a combined signal. The method continues with routing the combined signal through a first amplifier to amplify that signal. The combined signal is then routed through a first de-combiner to separate the combined signal into the distinct signals traveling in opposite, or the same, directions. The method can further include the step of routing the signals originating from opposite, or the same, directions through variable optical attenuators. Alternatively, the method can include the step of routing the combined signal through an L/C/S splitter, a second amplifier, and an L/C/S combiner.

The signals can travel through one of a multiplexor and a demultiplexor at points external to the amplifier. The method can further include the step of routing the combined signal through a dispersion compensation module, either as a stand-alone module, or as a part of a mid-stage access amplifier having a dispersion compensation module built within.

The optical amplifier node, according to still another aspect of the present invention, can include a first and second input fiber in communication with a first interleaver. The optical amplifier node further includes a first amplifier in communication with the first combiner. A first de-combiner is in communication with the first amplifier. At least two dispersion compensation modules are in communication with the first de-combiner. A second combiner is in communication with at least two dispersion compensation modules. A second amplifier is in communication with the second combiner. A second de-combiner is in communication with the second amplifier, and a first and second output fiber are in communication with the second de-combiner.

In accordance with still another embodiment of the present invention a method of amplifying optical signals is provided beginning with the step of routing a first plurality of signals through a first combiner to form a first combined plurality of signals. A second plurality of signals is routed through a second combiner to form a second combined plurality of signals. The first combined plurality of signals and the second combined plurality of signals are then routed through a third combiner to form a further combined signal. The further combined signal is then routed through an amplifier to generate an amplified signal. The optical signals entering the first, second, and third combiners can be narrow spaced, or wide spaced, channels traveling through single or multiple fibers.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION OF THE INVENTION

The illustrative embodiments of the present invention generally relate to the use of a single amplifier to amplify signals from a 4-fiber system (two input fibers and two output fibers). Prior technology utilizes a single amplifier for each fiber, which results in two amplifiers forming an amplifier node for a 4-fiber system. The present invention utilizes an optical combiner to multiplex an odd channel signal from a fiber containing signal traffic traveling in a first direction, or first fiber, with an even channel signal from a fiber containing signal traffic traveling in a second direction, or a second fiber in the same direction, into a single optical fiber. The single optical fiber then passes through the optical amplifier. In the output portion of the optical amplifier, the single optical signal is demultiplexed with a de-combiner. The four fibers into the system, the two inputs and two outputs, are then spatially directed to the correct routing.

FIGS. 2 through 9 wherein like parts are designated by like reference numerals throughout, illustrate example embodiments of an optical amplifier node according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed, such as the size, shape, or type of elements or materials, in a manner still in keeping with the spirit and scope of the present invention.

Figure 2:
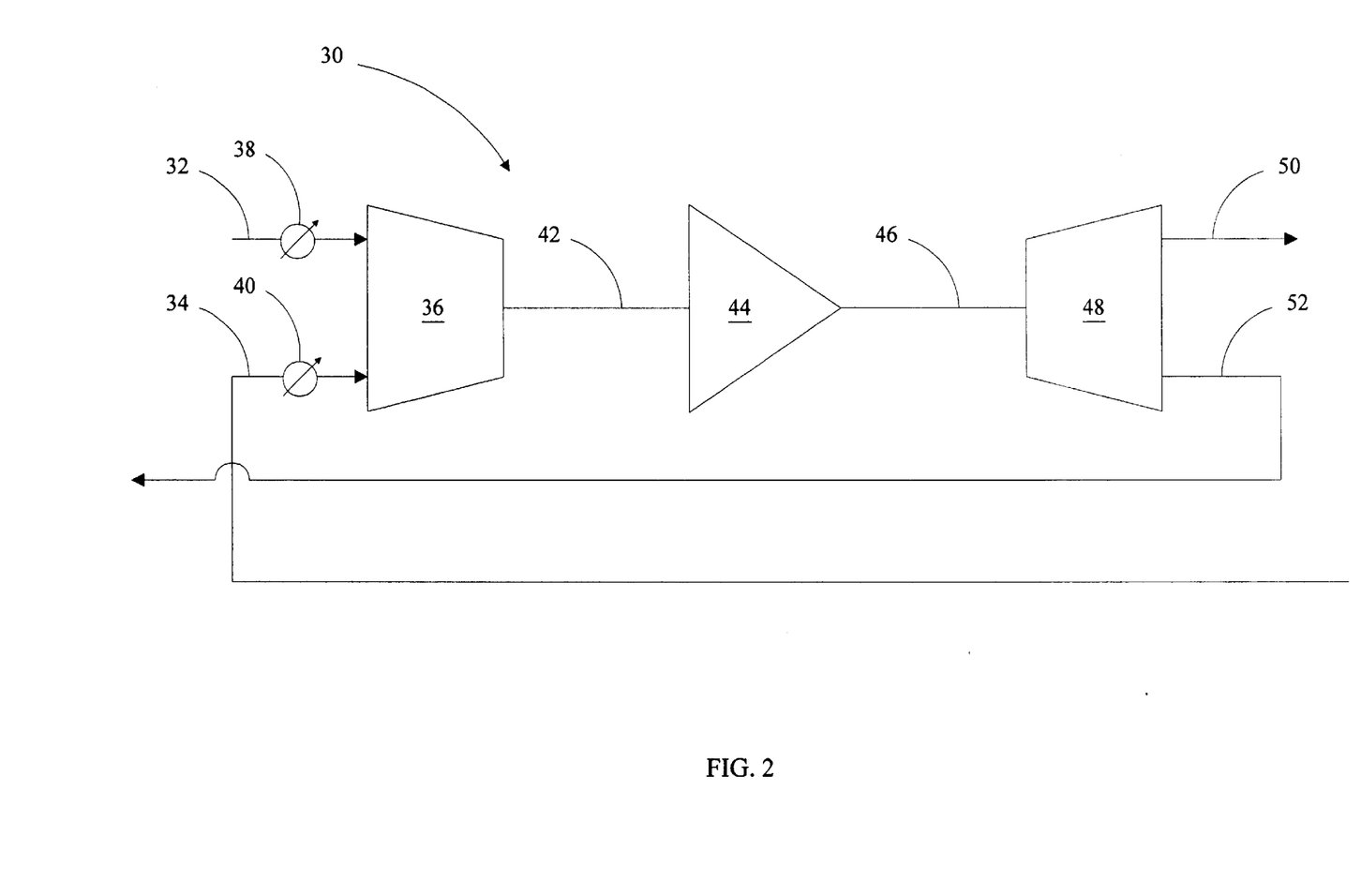
FIG. 2 is a diagrammatic illustration of an optical amplifier node according to a first embodiment of the present invention.

FIG. 2 illustrates an optical amplifier node 30 according to one embodiment of the present invention. There is an even channel signal that travels through a first input fiber 32 into a first interleaver 36. The even channel signal can be an odd channel signal, so long as the signal traveling through a second input fiber 34 is an even channel signal.

The even/odd channel separation is intended to indicate a signal being separated in an alternating fashion, e.g., every other sub-component of the signal is removed from the first signal to form two separate signals. The even/odd convention is utilized throughout this description for illustrative purposes only, and one of ordinary skill in the art will understand that the signals can be separated in any number of different manners, such as by bit, byte, wavelength, signal, band, and the like. The inventors anticipate that each of these different signal separation techniques are intended where appropriate in each illustrative instance of the even/odd channel separation technique as utilized throughout this description.

It should also be noted that each channel signal is associated with a separate wavelength, and a single fiber can carry a relatively large number of channels concurrently at different wavelengths.

A variable optical attenuator 38 is provided on the first input fiber 32 to attenuate the even channel signal as desired. If there is no need for attenuation, this optical attenuator 38 is not required as is understood by one of ordinary skill in the art.

The variable optical attenuators illustrated throughout FIGS. 2–9 are shown prior to the combiner/de-combiner and amplifier combinations, and after the combiner/decombiner and amplifier combinations. The applicants intend for the variable optical attenuators to be placed in either or both locations in all illustrated embodiments (although the variable optical attenuators are typically illustrated in one or the other locations herein), or alternatively in intermediate locations between combiners and de-combiners, as required by the particular implementations.

An odd channel signal enters the optical amplifier node 30 through the second input fiber 34. The odd channel signal travels in the opposite direction to the even channel signal. The odd channel signal enters the first interleaver 36 after passing through a variable optical attenuator 40. Again, this optical attenuator 40 is only required if attenuation of the signal is necessary.

A first interleaver 36 combines each of the even and odd channel signals into a combined signal, which then exits the first interleaver 36 through a connecting fiber 42. The connecting fiber 42 routes the combined signal to a first amplifier 44, which amplifies the signal.

The single amplified signal then leaves the amplifier 44 and travels through the connecting fiber 46 to a second interleaver 48. The second interleaver 48 splits the amplified signal into the respective even and odd channel signals. The even channel signal propagates in the same direction as it entered the optical amplifier node 30 by exiting through the first output fiber 50. The odd channel signal, likewise, propagates in its original direction by exiting the second interleaver 48 through the second output fiber 52.

Figure 3:
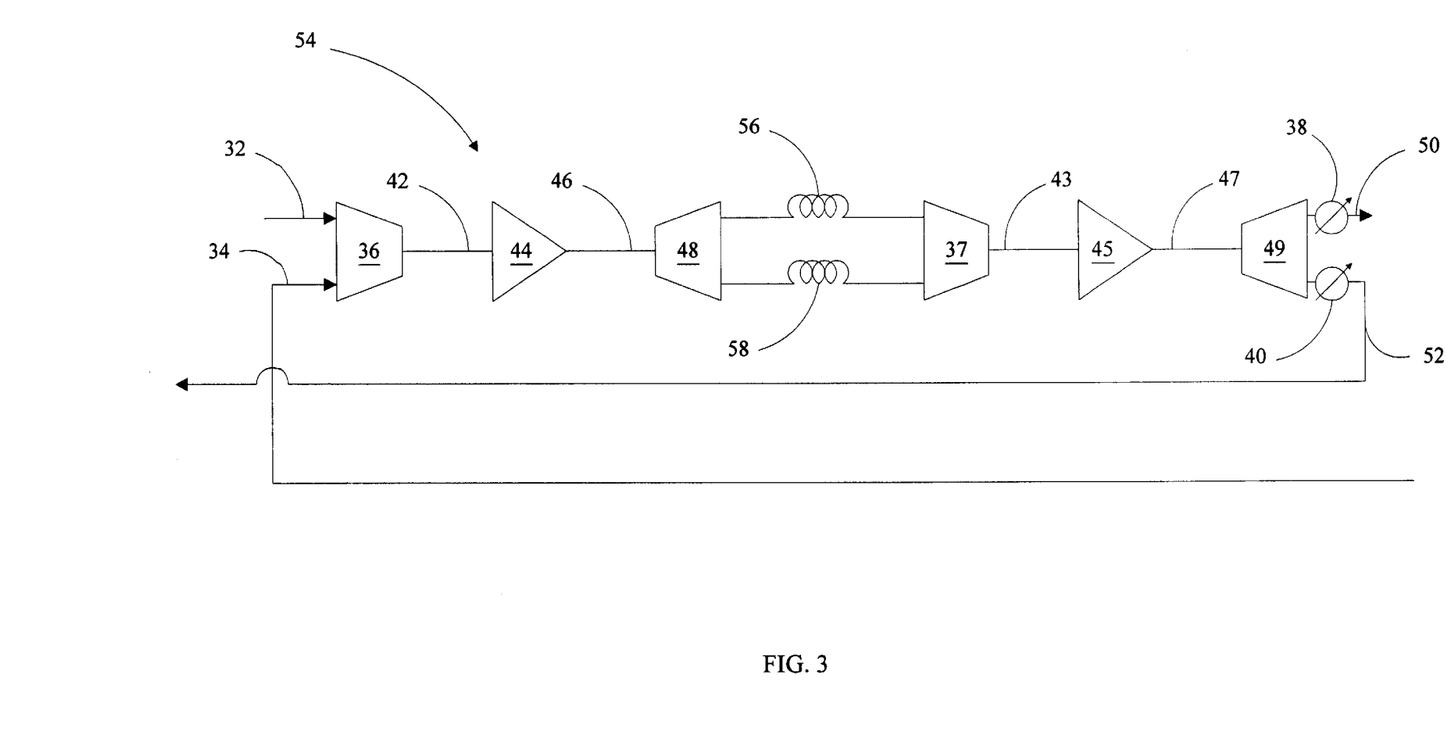
FIG. 3 is a diagrammatic illustration of an optical amplifier node according to a second embodiment of the present invention.

FIG. 3 illustrates another embodiment of an optical amplifier node 54. The illustrated embodiment combines two of the arrangements-shown in FIG. 2. The embodiment shown in FIG. 3 has a first input fiber 32 through which the even channel signal enters and the second input fiber 34 through which the odd channel signal enters. Again, these even and odd designations can be reversed as understood by one of ordinary skill in the art.

The signals combined in the first interleaver 36 travel through the connecting fiber 42 to the amplifier 44. The amplified combined signals exit the amplifier 44 and travel along the connecting fiber 46 to the second interleaver 48, where the signals are separated. At this point, the even channel signal travels through a first dispersion compensation module 56, while the odd channel signal travels through a second dispersion compensation module 58. Both signals are then combined in a third interleaver 37. The combined signals travel along a connecting fiber 43, through a second amplifier 45, along a connecting fiber 47, to a fourth interleaver 49. Upon exiting the fourth interleaver 49, the even channel signal passes through a variable optical attenuator 38 placed on the output fiber 50, while the odd channel signal passes through a variable optical attenuator 40 and passes through the second output fiber 52.

The optical attenuators 38 and 40 of FIG. 3 can be placed and attenuate the optical signals prior to entry into the amplifier or amplifiers, on either side of the dispersion compensation modules 56 and 58, or the optical signals can pass through the optical attenuators 38 and 40 subsequent to exiting the amplifier or amplifiers.

Figure 4:
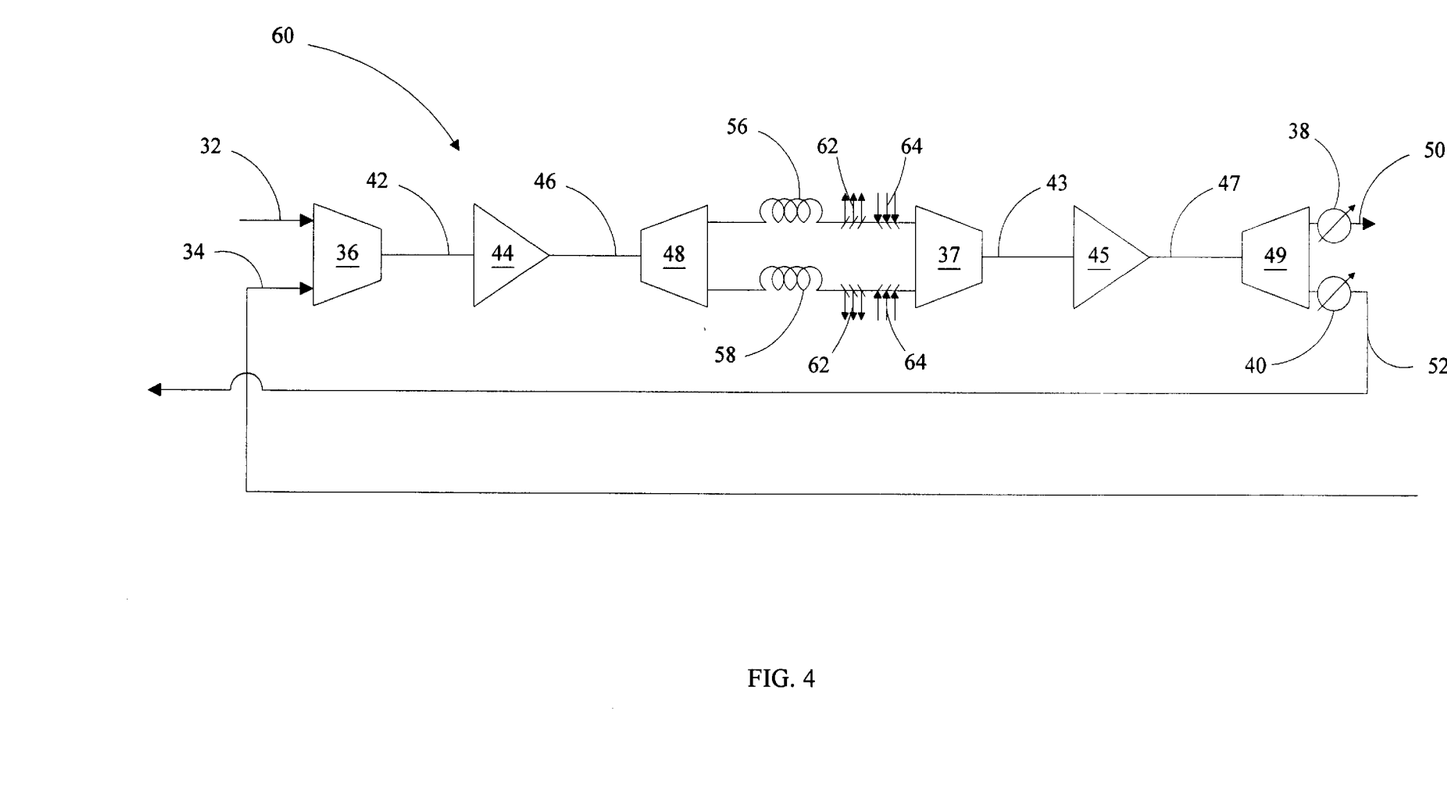
FIG. 4 is a diagrammatic illustration of an optical amplifier node according to a third embodiment of the present invention.

FIG. 4 illustrates still another embodiment of an optical amplifier node 60 according to aspects of the present invention. An even channel signal enters through the first input fiber 32 into the first interleaver 36, while the odd channel signal enters through the second input fiber 34 into the first interleaver 36. It should be noted that the even and odd channel designations are merely for illustrative purposes as being split signals that can be combined and split by the interleavers 36, 37, 48, and 49.

The combined signal propagates through the connecting fiber 42, the amplifier 44, the connecting fiber 46, and the second interleaver 48. The second interleaver 48 splits the combined signal into the respective even channel and odd channel signals. The even channel signals proceed through a first dispersion compensation module 56, and then passes through a channel drop 62 and a channel add 64. Meanwhile, the odd channel signal passes through a dispersion compensation module 58 and a separate channel drop 62 and channel add 64. The even and odd signals once again combine in the third interleaver 37 after passing through the channel drops 62 and channel adds 64.

The channel drop 64 enables the amplifier node 60 to remove predetermine channel signals from a stream of signals passing through the node 60. The channel add 64, likewise enables the amplifier node 60 to add predetermined channel signals to a stream of signals passing through the node 60.

The combined signals exit the third interleaver 37 along the connecting fiber 43 to the amplifier 45. The amplifier 45 amplifies the combined signal, and the amplified combined signal exits along the connecting fiber 47 to the fourth interleaver 49, where the combined signal is once again split into the even and odd channel signals. The even channel signal exits the interleaver 49, passes through the variable optical attenuator 38 and propagates along the first output fiber 50. The even channel signal exits the interleaver 49, passes through the variable optical attenuator 40, and propagates along the second output fiber 52.

Figure 5:
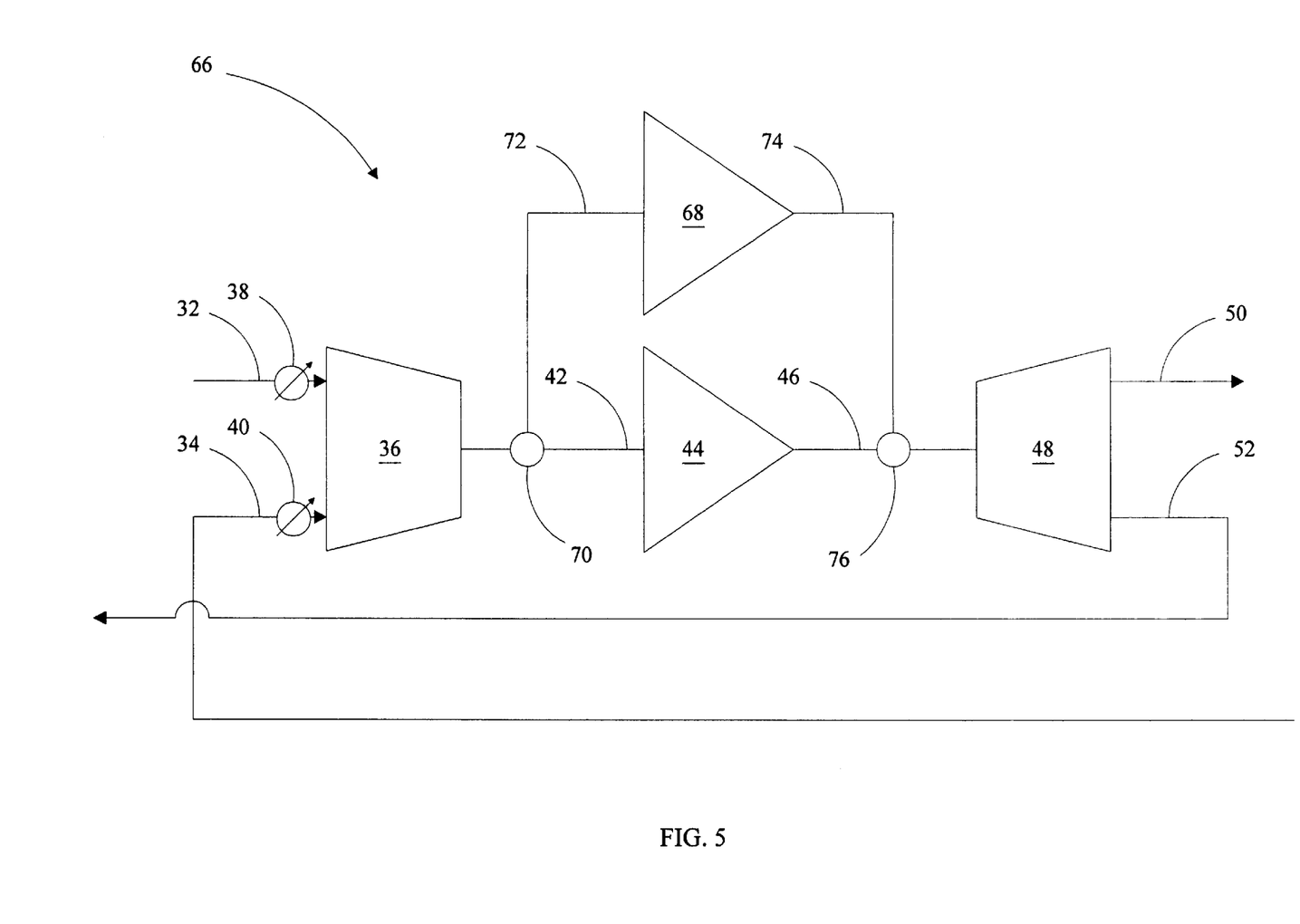
FIG. 5 is a diagrammatic illustration of an optical amplifier node according to a fourth embodiment of the present invention.

In still another embodiment of the invention, as illustrated in FIG. 5, another optical amplifier node 66 is provided. An even channel signal enters through the first input fiber 32 into the first interleaver 36. An odd channel signal enters through the second input fiber 34 into the first interleaver 36. Again, the even and odd channel designations are intended merely to illustrate a split signal that can be combined and split by the particular interleaver technology employed as previously detailed.

The first interleaver 36 combines the even and odd channel signals into a combined signal, which exits along the connecting path 42. The combined signal then enters an L/C/S splitter 70, whereupon the signal splits and a first portion of the signal travels along connecting fiber 72 to a second amplifier 68 while a second portion of the signal propagates along the connecting fiber 42 to the first amplifier 44. The first and second signal portions recombine at an L/C/S combiner 76 and enter the second interleaver 48 as a combined signal. The second interleaver 48 once again separates the combined signal into the respective even and odd channels, which exit the second interleaver 48 along the first output fiber 50 and the second output fiber 52.

Figure 6:
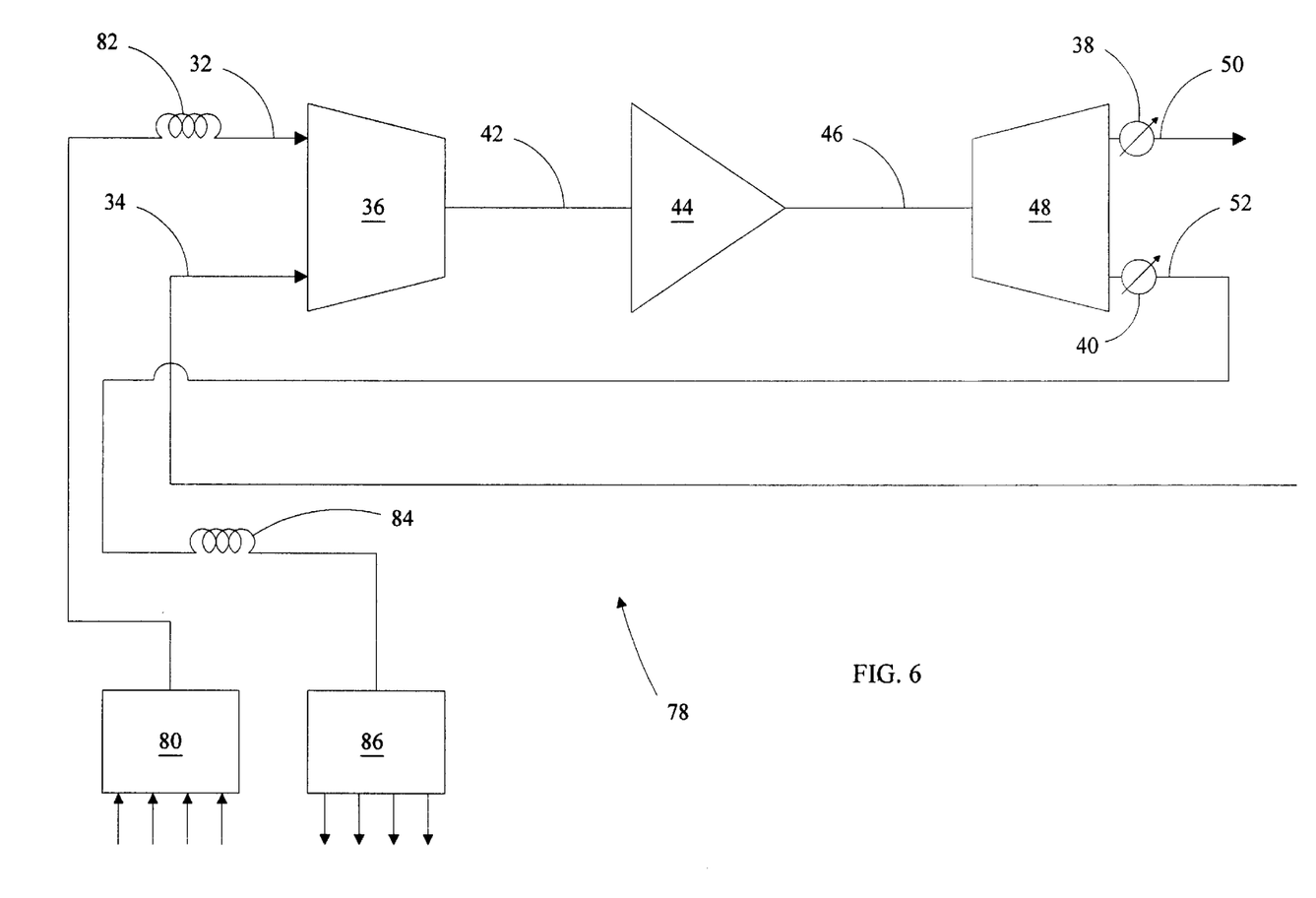
FIG. 6 is a diagrammatic illustration of an optical amplifier node according to a fifth embodiment of the present invention.

FIG. 6 illustrates still another optical amplifier node 78. In this optical amplifier node 78, e.g., the even channel signal first passes through a multiplexor 80 prior to passing through a dispersion compensation module 82 on the first input fiber 32, which leads to the first interleaver 36. The, e.g., odd channel signal enters directly through the second input fiber 34 into the first interleaver 36. The first interleaver 36 combines the even and odd channel signals into a combined signal and the combined signal exits the first interleaver 36 along the connecting fiber 42. The amplifier 44 amplifies the combined signal and the amplified combined signal travels along the connecting fiber 46 to the second interleaver 48. The second interleaver 48 separates the combined signal into even and odd channel signals. The even channel signal exits along the first output fiber 50, while the odd channel signal exits along the second output fiber 52, through a dispersion compensation module 84, and into a demultiplexor 86.

Figure 7:
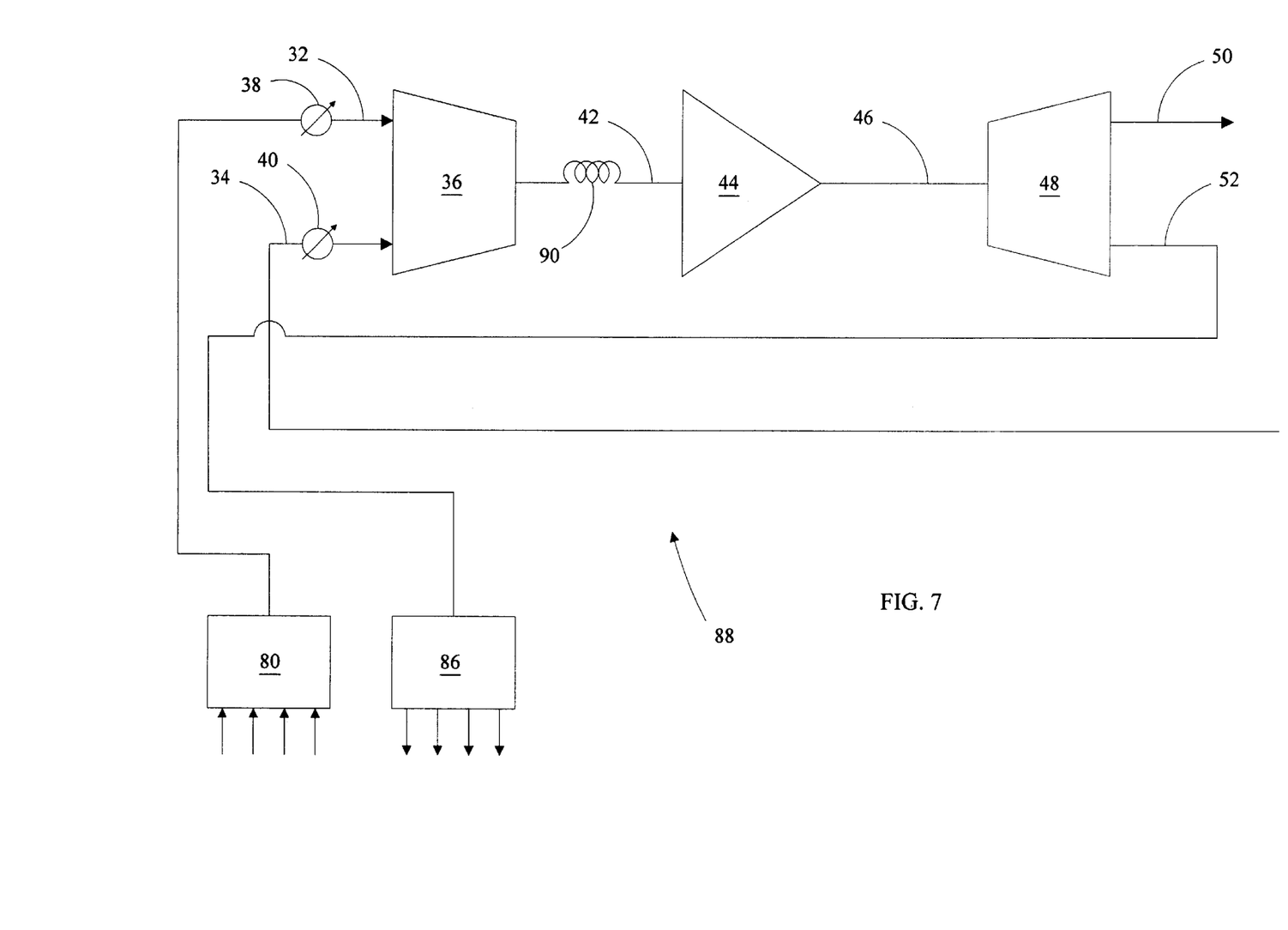
FIG. 7 is a diagrammatic illustration of an optical amplifier node according to a sixth embodiment of the present invention.

In an alternative arrangement to that of FIG. 6, an additional optical amplifier node 88 is illustrated in FIG. 7. The, e.g., even channel signal passes through the multiplexor 80 and enters the first interleaver 36 along the first input fiber 32. The, e.g., odd channel signal enters along the second input fiber 34 into the first interleaver 36. The first interleaver 36 combines the even and odd channel signals, and the combined signal exits along the connecting fiber 42 and through the dispersion compensation module 90. The combined signal is then amplified in the first amplifier 44, travels through the connecting fiber 46, and enters the second interleaver 48. The second interleaver 48 separates the signals into even and odd channels. The even channel exits on the first output fiber 50, while the odd channel exits through the second output fiber 52 and into the demultiplexor 86.

Figure 8:
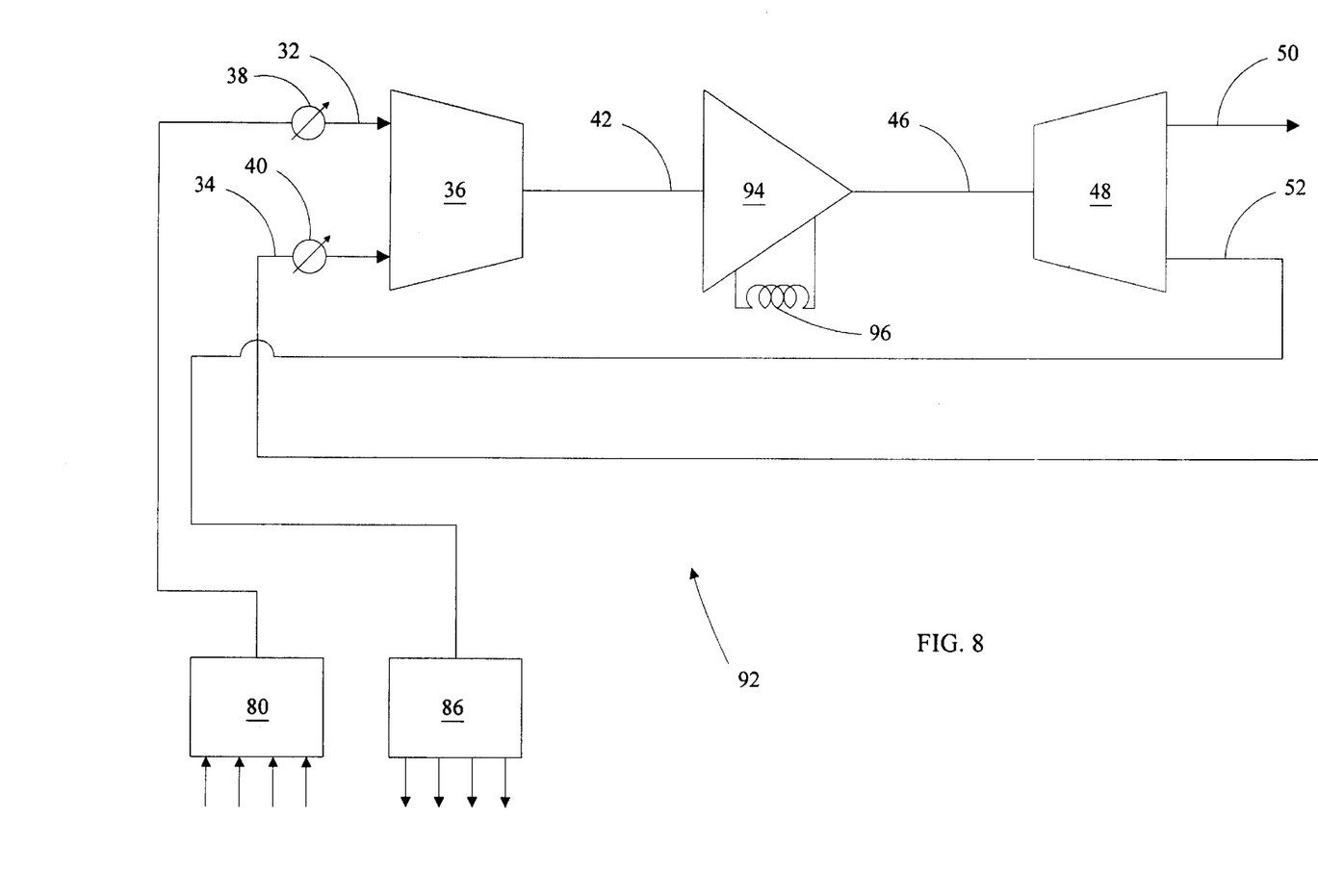
FIG. 8 is a diagrammatic illustration of an optical amplifier node according to a seventh embodiment of the present invention.

FIG. 8 illustrates still another embodiment of the present invention. An optical amplifier node 92 has an, e.g., even channel signal entering through the multiplexor 80, along the first input fiber 32, and into the first interleaver 36. The, e.g., odd channel signal enters the first interleaver 36 through the second input fiber 34. The first interleaver 36 combines the even and odd channels into a combined signal, which travels along the connecting fiber 42 to a mid-stage access amplifier 94 with a dispersion compensation module 96 built within. The amplified combined signal exits along the connecting fiber 46 and enters the second interleaver 48. The second interleaver 48 separates the even and odd channels, and the even channel exits along the first output fiber 50. The odd channel signal exits through the second output fiber 52, and enters the demultiplexor 86.

Figure 9:
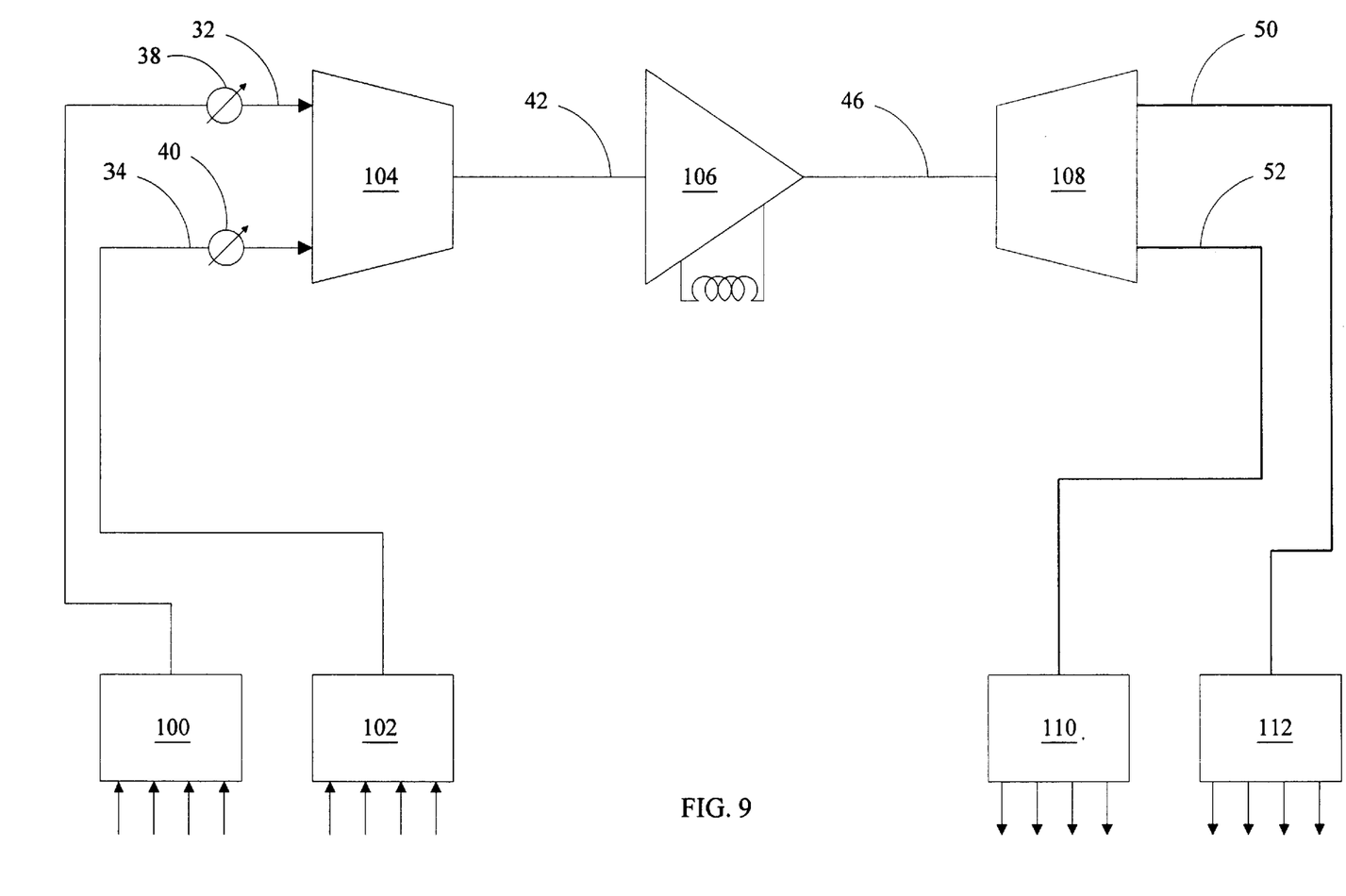
FIG. 9 is a diagrammatic illustration of an optical amplifier node according to an eighth embodiment of the present invention.

In addition, the ability of the method of the present invention to utilize a single amplifier for the amplification of multiple optical signals can be exploited beyond simply amplifying signals traveling in opposite directions. The method and apparatus of the present invention also applies to signals traveling in the same direction in a manner as depicted in FIG. 9. A plurality of signals, spaced narrowly or widely, enter a first combiner 100 through input fibers 32 and 34. The signals can pass through variable optical attenuators 38 and 40 as well, if required. An additional plurality of signals, spaced narrowly or widely, enter a second combiner 102. A signal is narrow spaced if the spacing is less than about 200 GHz, and a signal is wide spaced if the spacing is greater than about 200 GHz. However, one of ordinary skill in the art will appreciate that the characterizations of wide and narrow are relative and depend on the current state of the art. For example, in accordance with another embodiment, a signal is narrow spaced if the spacing is less than about 50 GHz, and wide spaced if the spacing is greater than about 50 GHz. In still another embodiment, the narrow spacing can be defined as less than about 25 GHz, and the wide spacing can be defined as greater than about 25 GHz.

After being combined, the signals pass through a third combiner 104 to further combine prior to being amplified as a combined signal in an amplifier 106. The amplified signal then passes through a first de-combiner 108, and a second and third de-combiner 110 and 112, prior to entering a plurality of fibers. Again, the amplified signal can be spaced either narrowly or widely.

The combiners and de-combiners as utilized in the present invention can take the form of a number of different optical elements, including multiplexor, interleaver, de-multiplexor, fiber Bragg grating, filter, add/drop node, and the like.

The method and apparatus as illustrated in FIG. 9 is compatible with an environment having a surplus of fiber. Rather than narrowly spacing the optical signals within a signal fiber, the availability of the surplus fiber allows wide channel spacing through multiple fibers. The wide channel spacing avoids optical non-linearities that are known to occur with narrow channel spacing. This further facilitates the ability to efficiently and relatively less expensively construct long-haul networks because components, such as costly polarization multiplexors and other equipment, are not required with the wide channel spacing arrangements. The amplifier 106 may require extra gain in order to achieve the same span rules due to insertion losses of the interleavers as understood by one of ordinary skill in the art. Further, extra gain may be required in the amplifier 106 to compensate for additional losses. However, the overall cost savings compensate for the additional required features.

There are many features and advantages associated with aspects of the present invention. Embodiments of the present invention provide amplification of optical signals traveling in opposite directions, or in the same direction through multiple fibers, using a single amplifier, thereby reducing the required number of amplifiers to perform signal amplification. The signals entering the amplifier node of the present invention must contain one collection of signals, e.g., odd channels, traveling in one direction, or one fiber, and another collection of signals, e.g., even channels traveling in the other direction, or another fiber. The channel signals can be traveling on for example, 200 GHz, 100 GHz, greater than 200 GHz, or less than 100 GHz channel spacing. There is only one gain available for the traffic traveling in both directions, or fibers, because there is only one amplifier. The introduction of a variable optical attenuator either before or after the amplifier enables two different effective gains. The optical performance of the amplifier node of the present invention has the same functionality as an amplifier node having two individual non-multiplexed amplifiers, one on each fiber, although the present invention requires only half the number of amplifiers, thus substantially reducing costs associated with forming the networked structures.

Numerous modifications and alternative embodiments of the invention will be apparent to those skilled in the art in view of the foregoing description. Accordingly, this description is to be construed as illustrative only and is for the purpose of teaching those skilled in the art the best mode for carrying out the invention. Details of the structure may vary substantially without departing from the spirit of the invention, and exclusive use of all modifications that come within the scope of the appended claims is reserved. It is intended that the invention be limited only to the extent required by the appended claims and the applicable rules of law.

What is claimed is:

1. A method of amplifying optical signals, comprising the steps of:

routing a first plurality of signals through a first combiner to form a first combined plurality of signals;

routing a second plurality of signals through a second combiner to form a second combined plurality of signals;

routing said first combined plurality of signals and said second combined plurality of signals through a third combiner to form a further combined signal;

routing said further combined signal through an amplifier to generate an amplified signal; and routing said further combined signals through at least one dispersion compensation module.

2. A method of amplifying optical signals, comprising the steps of:
routing a first plurality of signals through a first combiner to form a first combined plurality of signals;
routing a second plurality of signals through a second combiner to form a second combined plurality of signals;
routing said first combined plurality of signals and said second combined plurality of signals through a third combiner to form a further combined signal;
routing said further combined signal through an amplifier to generate an amplified signal; and
routing said further combined signals through a variable optical attenuator.

3. An optical amplifier node, comprising:
a first combiner;
a first and second input in communication with said first combiner;
a first amplifier in communication with said first combiner;
a first de-combiner in communication with said first amplifier;
a first and second output in communication with said first de-combiner; and
a first variable optical attenuator in communication with one of said first input and said first output.

4. The optical amplifier node of claim 3, wherein a second variable optical attenuator is in communication with one of said second input and said output.

5. The optical amplifier node of claim 3, further comprising at least one dispersion compensation module in communication with said at least one of first and second outputs.

6. The optical amplifier node of claim 5, further comprising at least one channel drop device in communication with one of said first de-combiner and said at least one dispersion compensation module.

7. The optical amplifier node of claim 5, further comprising at least one channel add device in communication with one of said first de-combiner and said at least one dispersion compensation module.

8. The optical amplifier node of claim 5, further comprising a second combiner in communication with said first and second dispersion compensation modules.

9. The optical amplifier node of claim 8, further comprising a second amplifier in communication with said second combiner.

10. The optical amplifier node of claim 9, further comprising a second de-combiner in communication with said second amplifier.

11. The optical amplifier node of claim 10, further comprising at least one variable optical attenuator in communication with said second de-combiner.

12. The optical amplifier node of claim 3, further comprising a second amplifier in communication with an L/C/S splitter and an L/C/S combiner.

13. The optical amplifier node of claim 3, further comprising a multiplexor in communication with said first combiner.

14. The optical amplifier node of claim 13, further comprising a dispersion compensation module positioned on the communication path between said multiplexor and said first combiner.

15. The optical amplifier node of claim 13, further comprising a dispersion compensation module positioned on the communication path between said first combiner and said first amplifier.

16. The optical amplifier node of claim 13, wherein said first amplifier is a mid-stage access amplifier having a dispersion compensation module.

17. The optical amplifier node of claim 3, further comprising a first demultiplexor in communication with said first de-combiner.

18. The optical amplifier node of claim 17, further comprising a dispersion compensation module positioned on the communication path between said first demultiplexor and said first de-combiner.

19. The optical amplifier node of claim 17, further comprising a dispersion compensation module positioned on the communication path between said first combiner and said first amplifier.

20. The optical amplifier node of claim 17, wherein said first amplifier is a mid-stage access amplifier having a dispersion compensation module.

21. The optical amplifier node of claim 17, further comprising a co-propagating Raman amplifier in communication with a plurality of fibers.

22. The optical amplifier node of claim 17, further comprising a counter-propagating Raman amplifier in communication with a plurality of fibers.

* * * * *